US012812386B2

(12) United States Patent
Ben-David

(10) Patent No.: US 12,812,386 B2
(45) **Date of Patent: *Nov. 24, 2026**

(54) SIM BASED APPLICATION ACTION AUTHENTICATION

(71) Applicant: Unibeam Ltd., Hod-HaSharon (IL)

(72) Inventor: Ran Ben-David, Hod-HaSharon (IL)

(73) Assignee: Unibeam Ltd., Hod-HaSharon (IL)

( * ) Notice: Subject to any disclaimer, the term of this patent is extended or adjusted under 35 U.S.C. 154(b) by 113 days.

This patent is subject to a terminal disclaimer.

(21) Appl. No.: 19/023,427

(22) Filed: Jan. 16, 2025

(65) Prior Publication Data

US 2025/0159484 A1 May 15, 2025

Related U.S. Application Data

(63) Continuation-in-part of application No. 18/096,154, filed on Jan. 12, 2023, now Pat. No. 12,641,078, which is a continuation-in-part of application No. 17/836,026, filed on Jun. 9, 2022, now abandoned, which is a continuation-in-part of application No. 17/667,597, filed on Feb. 9, 2022, now Pat. No. 12,207,095, application No. 19/023,427 is a (Continued)

(51) Int. Cl.
*H04W 12/72* (2021.01)
*H04W 12/06* (2021.01)

(52) U.S. Cl.
CPC ......... *H04W 12/72* (2021.01); *H04W 12/068* (2021.01)

(58) Field of Classification Search
CPC ... H04W 12/72; H04W 12/068; H04W 12/48; H04W 12/71
See application file for complete search history.

(56) References Cited

U.S. PATENT DOCUMENTS 10,390,226 B1 * 8/2019 Cheung ............... H04L 63/0853
2013/0283040 A1 * 10/2013 Tu .......................... H04W 4/60
726/5

(Continued)

FOREIGN PATENT DOCUMENTS

WO WO-2016001035 A1 * 1/2016 ............ H04W 12/06

OTHER PUBLICATIONS

Asokan et al., Generic Authentication Architecture, 2008, Wiley Telecom, Edition 1, 23-103 (Year: 2008).*

*Primary Examiner* — Catherine Thiaw
*Assistant Examiner* — Nega Woldemariam

(57) ABSTRACT

There is provided a system for authentication of a subscriber for accessing a service hosted by an application server using a mobile device, comprising: a processor of an authentication server executing a code for: obtaining an authentication request for authenticating a unique identifier of circuitry installed in a mobile device from an application server hosting a service, sending a message including the unique identifier of circuitry of the mobile device to a mobile network server, receiving a unique identifier of hardware of the mobile device from the mobile network server, wherein the unique identifier of hardware of the mobile device comprises a self-generated unique identifier generated based on unique data that is hard-wired into the mobile device, validating that the unique identifier of hardware of the mobile device corresponds to the unique identifier of circuitry of the mobile device, and sending an outcome of the validation to the application server.

18 Claims, 6 Drawing Sheets

Related U.S. Application Data continuation-in-part of application No. 17/667,597, filed on Feb. 9, 2022, now Pat. No. 12,207,095.

(56) References Cited

U.S. PATENT DOCUMENTS

| | | | | |
|---|---|---|---|---|
| 2017/0093910 | A1* | 3/2017 | Gukal | H04L 63/1416 |
| 2017/0171199 | A1* | 6/2017 | Bao | H04L 63/083 |
| 2017/0171200 | A1* | 6/2017 | Bao | H04L 9/3213 |
| 2018/0270249 | A1* | 9/2018 | Joshi | H04L 63/105 |
| 2018/0302401 | A1* | 10/2018 | Chan | H04L 63/0892 |
| 2019/0158996 | A1* | 5/2019 | Korkmaz | H04W 12/068 |
| 2020/0137557 | A1* | 4/2020 | Touati | H04W 4/00 |
| 2020/0137566 | A1* | 4/2020 | Jin | H04W 12/43 |
| 2020/0221300 | A1* | 7/2020 | Dumanois | H04W 12/06 |
| 2020/0280441 | A1* | 9/2020 | Ben-David | H04W 12/48 |
| 2022/0279351 | A1* | 9/2022 | Blasi | H04W 12/71 |

* cited by examiner

SIM BASED APPLICATION ACTION AUTHENTICATION

RELATED APPLICATIONS

This application is a Continuation-in-Part (CIP) of U.S. patent application Ser. No. 18/096,154 filed on Jan. 12, 2023, which is a Continuation-in-Part (CIP) of U.S. patent application Ser. No. 17/836,026 filed on Jun. 9, 2022, which is a Continuation-in-Part (CIP) of U.S. patent application Ser. No. 17/667,597 filed on Feb. 9, 2022.

This application is also a Continuation-in-Part (CIP) of U.S. patent application Ser. No. 17/667,597 filed on Feb. 9, 2022.

The contents of the above applications are all incorporated by reference as if fully set forth herein in their entirety.

BACKGROUND

The present invention, in some embodiments thereof, relates to cybersecurity and, more specifically, but not exclusively, to systems and methods for validation of a unique identifier.

Access to network-based services requires verification of a unique identifier in order to be performed securely. For example, logging into a bank web site may be done by the user entering a password. An online purchase may be further secured by sending a one-time password (OTP) such as a PIN number to a smartphone of the user. The user enters the OTP number as a verification. In another example, a user logs into a game server to play a game using user credentials that identify the user.

SUMMARY

According to a first aspect, a system for authentication of a subscriber for accessing a service hosted by an application server using a mobile device, comprises: at least one processor of an authentication server executing a code for: obtaining an authentication request for authenticating a unique identifier of circuitry installed in a mobile device from an application server hosting a service, the authentication request including the unique identifier, and a call back network address of the application server, and using the unique identifier as a destination address for sending a message to activate an applet for triggering validation of the unique identifier, the applet located in a storage component of the circuitry installed in the mobile device, wherein the applet sends an outcome of the validation to the application server using the call back network address.

In a further implementation form of the first aspect, the authentication request is obtained from the application server over a first communication session that has a different session identifier from a second communication session established between the mobile device and the application server.

In a further implementation form of the first aspect, the authentication request is sent by the application server in response to a login request to log into the service by an application running on the mobile device, wherein the application server responds to the login request according to the outcome of the validation obtained from the applet.

In a further implementation form of the first aspect, further comprising receiving from the applet at least one unique identifier of hardware installed within the mobile device from the applet, validating that the at least one unique identifier of hardware installed within the mobile device matches a record created when the circuitry within the mobile device is activated, and sending an outcome of the validation from the authentication server to the applet.

In a further implementation form of the first aspect, further comprising establishing a communication session with the applet in response to a request to establish the communication session sent by the applet, wherein the applet and the authentication server communicate over the communication session.

In a further implementation form of the first aspect, the unique identifier of circuitry installed in the mobile device comprises a mobile station integrated services digital network (MSISDN) number.

In a further implementation form of the first aspect, the applet at least one of: (i) establishes a communication session with the application server using the call back network address, and the applet sends the outcome of the validation to the application server over the communication session through a Bearer Independent Protocol (BIP) channel, and (ii) the applet sends the outcome of the validation to the authentication server through a Bearer Independent Protocol (BIP) channel or via a class 1 SMS message.

In a further implementation form of the first aspect, using the unique identifier as the destination address for sending the message to the mobile device comprises sending a class 2 message to a phone number of the mobile device defined by the unique identifier.

According to a second aspect, a system for authentication of a subscriber for accessing a service hosted by an application server using a mobile device, comprises: at least one processor of a mobile device executing a code for: receiving a message from an authentication server sent in response to a login request sent by an application running on the mobile device to log into a service hosted by an application server, wherein the message includes a call back network address of the application server, validating by an applet stored in a storage component of the circuitry of the mobile device, a unique identifier of circuitry installed in the mobile device, and sending by the applet, an outcome of the validation to the application server using the call back network address.

In a further implementation form of the second aspect, the outcome of the validation sent by the applet to the application server includes at least one unique identifier of hardware installed within the mobile device, wherein the application server authorizes the login request by matching the at least one unique identifier of hardware obtained from the applet to a unique identifier of the mobile device sent by the application and/or operating system running on the mobile device according to a record managed by the application server that binds the at least one unique identifier of hardware installed within the mobile device to the unique identifier of the mobile device sent by the application and/or operating system.

In a further implementation form of the second aspect, the record further binds at least one of: the unique identifier of the circuitry installed in the mobile device used as a destination address for sending the message from the authentication server to the applet, a username for login, and a password for login.

In a further implementation form of the second aspect, the at least one unique identifier of hardware installed within the mobile device includes at least one of: IMEI (International Mobile Equipment Identity, e.g., device ID), EDI, and ICCID (Integrated Circuity Card Identification, e.g., SIM ID).

In a further implementation form of the second aspect, the message received from the authentication server further includes at least one authentication data element sent by the application server to the authentication server, wherein the applet sends the at least one authentication data element to the application server in association with the outcome of the validation for authorization of the login request associated with the at least one authentication data element.

In a further implementation form of the second aspect, the at least one data authentication element includes at least one of: a unique identifier of a communication session established between the mobile device and the application server, a client key comprising a unique identifier of the application running on the mobile device, wherein the application comprises a browser running on the mobile device attempting to access the service and a browser key comprising a unique identifier of the browser, and a service key comprising a unique identifier of the service.

In a further implementation form of the second aspect, further comprising: sending by the applet to the authentication server, at least one unique identifier of hardware installed within the mobile device, validating by the authentication server that the at least one unique identifier of hardware installed within the mobile device matches a record created when the circuitry within the mobile device is activated, and sending an outcome of the validation from the authentication server to the applet.

In a further implementation form of the second aspect, further comprising establishing by the applet, a communication session with the authentication server, wherein the applet communicates with the authentication server over the communication session.

In a further implementation form of the second aspect, the applet establishes a communication session with the application server using the call back network address, and the applet sends the outcome of the validation to the application server over the communication session.

In a further implementation form of the second aspect, the unique identifier comprise a MSISDN of the user, and the message comprises a class 2 message sent to the MSISDN of the mobile device.

According to a third aspect, a system for authentication of a subscriber for accessing a service hosted by an application server using a mobile device, comprises: at least one processor of an application server executing a code for: obtaining a login request to log into the service hosted by the application server by an application running on the mobile device, obtaining a unique identifier of circuitry installed in the mobile device, sending to an authentication server, an authentication request for validation of the unique identifier of circuitry installed in the mobile device, the authentication request including the unique identifier, and a call back network address of the application server, obtaining via the callback network address, an outcome of the validation of the unique identifier, from an applet stored in a storage component of the circuitry of the mobile device, and responding to the login request according to the outcome of the validation.

In a further implementation form of the third aspect, the outcome of the validation received from the applet includes at least one unique identifier of hardware installed within the mobile device, wherein the application server authorizes the login request by matching the at least one unique identifier of hardware obtained from the applet to a unique identifier of the mobile device sent by the application and/or operating system running on the mobile device according to a record managed by the application server that binds the at least one unique identifier of hardware installed within the mobile device to the unique identifier of the mobile device sent by the application and/or operating system.

In a further implementation form of the third aspect, the record further binds at least one of: the unique identifier of the circuitry installed in the mobile device used as a destination address for sending a message from the authentication server to the applet, a username for login, and a password for login.

In a further implementation form of the third aspect, the unique identifier is non-extractable from a communication session established between the mobile device and the application server, and the unique identifier is not added as metadata of a header of packets sent by the application server.

In a further implementation form of the third aspect, the unique identifier is provided by a user only at a time of registration for the service, and stored on a data storage device and accessed by the application server when the application running on the mobile device attempts to log into the service.

In a further implementation form of the third aspect, the unique identifier is provided by the mobile device when the application running on the mobile device attempts to log into the service.

In a further implementation form of the third aspect, the authentication request includes at least one authentication data element, wherein the applet sends the at least one authentication data element to the application server via the callback network address, and further comprising validating the at least one authentication element obtained from the applet.

In a further implementation form of the third aspect, further comprising rejecting the login request when at least one of: the outcome of the validation obtained from the applet indicates invalidity, and the validation of the at least one authentication element obtained from the applet indicates invalidity.

According to a fourth aspect, a system for authentication of a subscriber using a mobile device for accessing a website via a forwarding server, comprises: at least one processor of the forwarding server executing a code for: obtaining an address of a website from the mobile device, obtaining a unique identifier of circuitry installed in the mobile device, sending to an authentication server, an authentication request for validation of the unique identifier of circuitry installed in the mobile device, the authentication request including the unique identifier, and a call back network address of the forwarding server, obtaining via the callback network address, an outcome of the validation of the unique identifier, from an applet stored in a storage component of the circuitry of the mobile device, and establishing a communication session between the mobile device and the website according to the outcome of the validation.

According to a fifth aspect, a system for authentication of a subscriber for accessing a service hosted by an application server using a mobile device, comprises: at least one processor of an authentication server executing a code for: obtaining an authentication request for authenticating a unique identifier of circuitry installed in a mobile device from an application server hosting a service, the authentication request including the unique identifier, sending a message including the unique identifier of circuitry of the mobile device to a mobile network server, receiving a unique identifier of hardware of the mobile device from the mobile network server, wherein the unique identifier of hardware of the mobile device comprises a self-generated unique identifier generated based on unique data that is hard-wired into the mobile device, performing validation of the unique identifier of the circuitry of the mobile device by validating that the unique identifier of hardware of the mobile device corresponds to the unique identifier of circuitry of the mobile device, and sending an outcome of the validation to the application server.

In a further implementation form of the fifth aspect, the self-generated unique identifier is computed by feeding the unique data into a cryptographic process that computes a cryptographic value.

In a further implementation form of the fifth aspect, the self-generated unique identifier is computed based on a combination of the unique data and metadata provided by the application fed into a hashing process.

In a further implementation form of the fifth aspect, the self-generated unique identifier is computed by an applet stored in a storage component of circuitry installed in the mobile device.

In a further implementation form of the fifth aspect, the unique data that is hard-wired into the circuitry comprises an international mobile subscriber identity (IMSI).

In a further implementation form of the fifth aspect, the unique identifier of the hardware of the mobile device indicates that the mobile device is authenticated for cellular communication by a service provider associated with the mobile network server.

In a further implementation form of the fifth aspect, the unique identifier of hardware installed within the mobile comprises an Integrated Circuity Card Identification (ICCID), and the unique identifier of circuitry comprises a mobile station integrated services digital network (MSISDN) number and/or IMSI, and the validation is performed by verifying that the ICCID obtained from the mobile network server corresponds to the MSISN and/or the IMSIs at a time interval of performing the authentication.

In a further implementation form of the fifth aspect, the unique identifier of hardware installed within the mobile comprises a Embedded Mobile Equipment Identity (EMEI), and the unique identifier of circuitry comprises a MSISDN and/or IMSI, and the validation is performed by verifying that the EMEI obtained from the mobile network server corresponds to the MSISN and/or the IMSI at a time interval of performing the authentication.

In a further implementation form of the fifth aspect, the authentication request is sent by the application server in response to a login request to log into the service automatically generated by an application running on the mobile device, the login request excludes user entered data and includes automatically self-generated data created by the application running on the mobile device and/or by an applet running on the mobile device, and the application server validates the login request by matching the automatically self-generated data to a user profile record.

In a further implementation form of the fifth aspect, the user entered data excluded from the login request includes a name of the user, a username of the user, and a password of the user.

In a further implementation form of the fifth aspect, the login request is automatically generated and sent in response to a user click or touch of a button without providing the user entered data.

In a further implementation form of the fifth aspect, the self-generated data includes at least one of an App ID generated by the application, and at least one self-generated unique number created by the applet.

In a further implementation form of the fifth aspect, the at least one self-generated unique number is selected from: ICCID denoting a SIM ID, and EMEI denoting a device ID.

In a further implementation form of the fifth aspect, the authentication request is sent by the application server in response to a login request to log into the service by an application running on the mobile device, the login request including the unique identifier of circuitry installed within the mobile device, and the authentication request may be sent in response to validating by the application server that the unique identifier of circuitry matches a user profile record created when the circuitry within the mobile device is activated.

In a further implementation form of the fifth aspect, the authentication request includes additional data, and the user profile record stores additional data.

In a further implementation form of the fifth aspect, the additional data includes at least one of: a name of the user, a username of the user, a password of the user, an App ID created by the application running on the mobile device, the unique identifier of circuitry installed within the mobile device, and the unique identifier of hardware installed within the mobile device.

According to a sixth aspect, system for authentication of a subscriber for accessing a service hosted by an application server using a mobile device, comprises: at least one processor of an application server executing a code for: obtaining a login request to log into the service hosted by the application server by an application running on the mobile device, obtaining a unique identifier of circuitry installed in the mobile device, sending to an authentication server, an authentication request for validation of the unique identifier of circuitry installed in the mobile device, the authentication request including the unique identifier, obtaining from the authentication server, an outcome of the validation of the unique identifier of circuitry performed by validating that a unique identifier of hardware of the mobile device obtained from a mobile network server corresponds to the unique identifier of circuitry of the mobile device, wherein the unique identifier of hardware of the mobile device comprises a self-generated unique identifier generated based on unique data that is hard-wired into the mobile device, and responding to the login request according to the outcome of the validation.

In a further implementation form of the sixth aspect, the unique identifier of hardware installed within the mobile comprises a ICCID denoting a SIM ID, and the unique identifier of circuitry comprises a mobile station integrated services digital network (MSISDN) number and/or IMSI, and the validation is performed by verifying that the ICCID obtained from the mobile network server corresponds to the MSISN and/or the IMSI at a time interval of performing the authentication.

In a further implementation form of the sixth aspect, the unique identifier of hardware installed within the mobile comprises a EMEI denoting a device ID, and the unique identifier of circuitry comprises a MSISDN and/or IMSI, and the validation is performed by verifying that the EMEI obtained from the mobile network server corresponds to the MSISN and/or the IMSI at a time interval of performing the authentication.

In a further implementation form of the sixth aspect, the login request is automatically generated by an application running on the mobile device, the login request excludes user entered data and includes automatically self-generated data created by the application running on the mobile device and/or by an applet running on the mobile device, and the application server validates the login request by matching the automatically self-generated data to a user profile record, wherein the user entered data excluded from the login request includes a name of the user, a username of the user, and a password of the user, and the login request is automatically generated and sent in response to a user click or touch of a button without providing the user entered data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
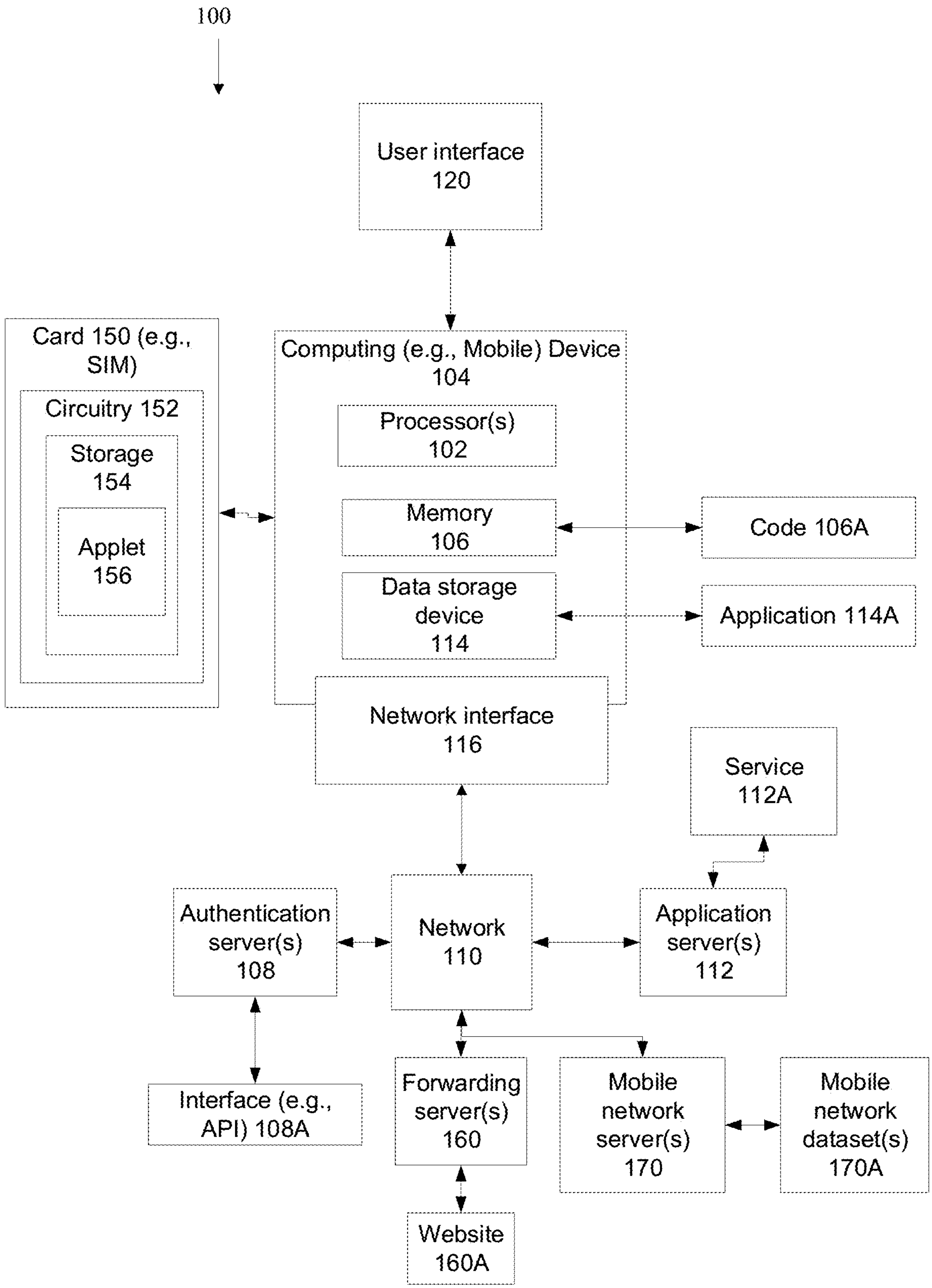
FIG. 1 is a block diagram of components of a system for authentication of a subscriber for accessing a service hosted by an application server (and/or for accessing a website via forwarding server) using a mobile device, in accordance with some embodiments of the present invention.

The present invention, in some embodiments thereof, relates to cybersecurity and, more specifically, but not exclusively, to systems and methods for validation of a unique identifier.

As used herein, the term subscriber identification module (SIM) card or SIM represents an exemplary implementation of a circuitry that is used by devices for cellular communication provided by a service provider. The term SIM is used as a not necessarily limiting example, as other implementations of circuitry may be used, for example embedded SIM (eSIM), and Universal Integrated Circuit Card (UICC). The term smart card may be used interchangeably with the term circuitry.

As used herein, the term mobile device represents an exemplary implementation of a computing device. The term mobile device is not necessarily limiting, and other devices that include circuitry (e.g., SIM card that is inserted into a slot of the mobile device, eSIM that is embedded directly into the mobile device) installed therein, may be used for accessing a service and/or a web site.

An aspect of some embodiments of the present invention relates to systems, methods, computing devices, and/or code instructions (stored on a data storage device and executable by one or more processors) for authentication of a subscriber by an authentication server for accessing a service hosted by an application server using a mobile device. At least one processor of an authentication server executes a code for obtaining an authentication request for authenticating a unique identifier of circuitry installed in a mobile device from an application server hosting a service. The authentication request including the unique identifier of the circuitry, for example, Mobile Station Integrated Services Digital Network (MSISDN) and/or international mobile subscriber identity (IMSI), (e.g., phone number) of the circuitry such as SIM card, eSIM card, and the like. The authentication server sends a message to a mobile network server, where the message includes the unique identifier of circuitry of the mobile device. In response to the message, a unique identifier of hardware of the mobile device is received from the mobile device server. Examples of the unique identifier of hardware include Integrated Circuity Card Identification (ICCID) which may denote a SIM ID, and Embedded Mobile Equipment Identity (EMEI) which may denote a device ID. The unique identifier of hardware of the mobile device may be implemented as a self-generated unique identifier generated based on unique data that is hard-wired into the mobile device, for example, by feeding the IMSI into a cryptographic process. The unique identifier of the circuitry of the mobile device may be validated by checking that the unique identifier of hardware of the mobile device corresponds to the unique identifier of circuitry of the mobile device, for example, by looking up the unique identifier of the circuitry in a dataset of records of mobile devices that store unique identifiers of hardware and of circuitry of mobile devices. The validation may be performed by the authentication server, the application server, and/or another device. An outcome of the validation may be sent to the application server. The application server may take action based on the validation, such as allow the mobile device to login to the service when the validation is successful, or deny login when the validation is unsuccessful.

An aspect of some embodiments of the present invention relates to systems, methods, computing devices, and/or code instructions (stored on a data storage device and executable by one or more processors) for authentication of a subscriber for accessing a service hosted by an application server using a mobile device. At least one processor of an application server executes a code for obtaining a login request to log into the service hosted by the application server by an application running on the mobile device. A unique identifier of circuitry installed in the mobile device is obtained. An authentication request for validation of the unique identifier of circuitry installed in the mobile device is sent to an authentication server. The authentication request including the unique identifier. In response to the authentication request, an outcome of the validation of the unique identifier of the circuitry is obtained from the authentication server. The validation may be performed by validating that a unique identifier of hardware of the mobile device obtained from a mobile network server corresponds to the unique identifier of circuitry of the mobile device. The validation may be performed by the authentication server, the application server, and/or another device. The unique identifier of hardware of the mobile device may be implemented as a self-generated unique identifier generated based on unique data that is hard-wired into the mobile device. The application server responds to the login request according to the outcome of the validation.

At least some embodiments described herein provide secure login of mobile devices to application servers, without requiring users to enter sensitive data such as a username, password, and the like. As described herein, unique identifiers of the mobile device are used to authenticate the user for login, rather than using personal and/or sensitive data of the user. Not requiring the users to enter sensitive data prevents theft of the data, providing higher security against malicious entry using the user's sensitive data. Moreover, the user experience is enhanced, since users do not need to remember their usernames and/or passwords. The practical application is a fast, easy, and secure login.

In some embodiments, the login request may be automatically generated by the application running on the mobile device, without requiring that the user enter data, such as username, password, and the like. For example, the user may simply click on a login button and/or press a login link, for triggering the login request. The login request may be processed without requiring a password, username, and the like, from the user, by validating the mobile device using unique identifiers of the hardware and/or of the circuitry of the mobile device, without input of data from the user.

An aspect of some embodiments of the present invention relates to systems, methods, computing devices, and/or code instructions (stored on a data storage device and executable by one or more processors) for authentication of a subscriber by an authentication server for accessing a service hosted by an application server using a mobile device. An authentication request is obtained from the application server over a first communication session that has a different session identifier from a second communication session established between the mobile device and the application server. A unique identifier (e.g., Mobile Station Integrated Services Digital Network (MSISDN), i.e., phone number) of the circuitry (e.g., SIM, eSIM card) of the mobile device is not provided in and/or obtainable from the communication session established between the mobile device and the application server. For example, the unique identifier cannot be extracted from the communication session, and/or the unique identifier is not added as metadata of a header of packets sent by the application server.

A processor(s) of the authentication server executes code for obtaining the authentication request for authenticating the unique identifier of circuitry installed in the mobile device from the application server hosting the service. The authentication request includes the unique identifier, and a call back network address of the application server. The unique identifier is used as a destination address for sending a message to activate an applet for triggering validation of the unique identifier. The applet is located in a storage component of the circuitry installed in the mobile device. The applet sends an outcome of the validation to the application server using the call back network address.

A processor(s) of the application server executing a code for obtaining a login request to log into the service hosted by the application server by an application running on the mobile device. A unique identifier of circuitry installed in the mobile device is obtained. The processor executes code for sending the authentication request for validation of the unique identifier to the authentication server. The authentication request includes the unique identifier, and the call back network address of the application server. The callback network address is used to obtain an outcome of the validation of the unique identifier from the applet stored of the mobile device. The processor(s) of the application server executes code for responding to the login request according to the outcome of the validation.

In some embodiments, an example of the application server is the forwarding server, and the service which the mobile device is attempting to access is the website.

An aspect of some embodiments of the present invention relates to systems, methods, computing devices, and/or code instructions (stored on a data storage device and executable by one or more processors) for authentication of a subscriber using a mobile device for accessing a website via a forwarding server. A processor(s) of the forwarding server executing a code for obtaining an address of a website from the mobile device. The processor(s) obtains a unique identifier of circuitry installed in the mobile device. An authentication request for validation of the unique identifier of circuitry installed in the mobile device is sent to an authentication server. The authentication request includes the unique identifier, and a call back network address of the forwarding server. An outcome of the validation of the unique identifier is obtained via the callback network address. The outcome of the validation is obtained from an applet stored in a storage component of the circuitry of the mobile device. The processor(s) of the forwarding server establishes a communication session between the mobile device and the website according to the outcome of the validation.

At least some embodiments described herein address the technical problem of authentication of a unique identifier, for example, for accessing a service hosted by a service server and/or for accessing a website via a forwarding server. The unique identifier may be of circuitry installed in a mobile device, for example, a MSISDN number assigned to a SIM card installed in the mobile device. The technical problem may further relate to authentication using the unique identifier (e.g., MSISDN) for accessing the service, without necessarily requiring providing the unique identifier during the access attempt, for example, the unique identifier is not necessarily provided during a communication session between a mobile device and the service. At least some embodiments described herein improve the technology of cybersecurity, by providing an improved approach for authentication of the unique identifier.

At least some embodiments described herein address the technical problem of authentication of a unique identifier, optionally MSISDN (i.e., phone number), for accessing a service hosted by a server (and/or for accessing a website via a forwarding server) via a communication session without linking the unique identifier (e.g., MSISDN) to the communication session, for example, as defined by the Extensible Authentication Protocol Method for Universal Mobile Telecommunications System (UMTS) Authentication and Key Agreement (EAP-AKA), which is an EAP mechanism for authentication and session key distribution using the UMTS Subscriber Identity Module (USIM). EAP-AKA is defined in RFC 4187. EAP-AKA indicates that the authentication is to be done using the MSISDN, without obtaining the MSISDN from a communication session established by the mobile device and an application server hosting a service that is being accessed by an application running on the mobile device. At least some embodiments described herein improve the technology of cybersecurity, by providing an improved approach for authentication of the unique identifier. Prior approaches use header enrichment to provide the MSISDN to downstream devices, and/or extract the MSISDN from a communication session established between a mobile device and a service server hosting a service which the mobile device is attempting to access. Such header enrichment and/or extraction of the MSISDN from the communication cannot be used by EAP-AKA. Other prior approaches use a pop-up displayed on a display of the mobile device to the user to request the MSISDN. In contrast, at least some embodiments described herein authenticate the MSISDN (or other unique identifier of circuitry installed in the mobile device) without using data of the session between the mobile device and the service server, for example, without extracting the MSISDN from the communication session and/or without using header enrichment and/or without using pop-ups. At least some embodiments described herein solve the technical problem of authentication using MSISDN according to EAP-AKA.

At least some embodiments described herein address the technical problem of authentication of a unique identifier of circuitry of a mobile device (e.g., MSISDN) of a third party, without having direct access to data for authentication, which cannot be directed obtained without access to the application store and the ecosystem around it (e.g., including monitoring of applications, install numbers, statistical data, user behavior, etc.), where the application is running on the mobile device, and/or without having access to the mobile device and/or without having direct access to the operating system running on the mobile device. For example, for complying with the EAP-AKA. At least some embodiments described herein improve the technology of cybersecurity, by providing an approach for authentication of a unique identifier of circuitry of a mobile device (e.g., MSISDN) of a third party, without having direct access to the mobile device and/or without having direct access to the operating system running on the mobile device. For example, for complying with the EAP-AKA. At least some embodiments described herein provide a solution to the aforementioned technical problem, and/or improve the aforementioned technology, by using an authentication server and/or applet installed on the mobile device, to provide an authentication service to a third party such as an application server, without requiring direct access to the mobile device and/or without requiring direct access to the operating system running on the mobile device. Embodiments described herein communicate with the applet running on the mobile device to validate the unique identifier of the circuitry of the mobile device and/or use the authentication server to validate unique identifier(s) of hardware of the mobile device, and/or access a mobile network server to obtain data for validation of the mobile device, which enables performing the authentication without direct access to the mobile device and/or without requiring direct access to the operating system running on the mobile device. At least some embodiments described herein may provide an independent authentication service to arbitrary application server and/or arbitrary mobile devices, for example, to third parties (e.g., arbitrary application server and/or arbitrary mobile devices). Approaches described herein (e.g., dataflows described herein which include the applet and/or authentication server) are in contrast to approaches in which access to authentication data is available, for example, when access to the application store and/or ecosystem around it and/or access to the mobile device and/or access to the operating system, is available. When the authentication data is available, the authentication may be readily done without resorting to external components such as the applet and/or authentication server described herein. It is noted that authentication data may not be directly obtainable without the user's knowledge, even when access to the authentication data is available (e.g., by direct access to the application store and/or ecosystem around it, mobile device, operating system, etc. . . . ), for example, due to privacy laws which may prohibit obtaining and/or using such data. At least some embodiments described herein may be used with systems that have direct access to the authentication data in order to comply with privacy laws.

At least some embodiments described herein separate the user of the mobile device from the unique identifier of circuitry of the mobile device, for authentication of the unique identifier of the circuitry without requiring knowledge of the user of the mobile device. In contrast, approaches that require direct access to the authentication data (e.g., to the application store and/or ecosystem around it, application store, mobile device and/or direct access to the operating system running on the mobile device tie the user to the unique identifier, and cannot authenticate the unique identifier without knowledge of the user.

At least some embodiments described herein address the technical problem of preventing or reducing malicious activity resulting from obtaining a phone number of a mobile device from a communication session between the mobile device and a service server hosting a service to which the mobile device is attempting to log into, and/or has logged into. For example social engineering fraud where a malicious entity calls a person on their phone using a number extracted from the communication session, and asks the person to perform actions which grant the malicious entity access to sensitive data to perform malicious activities such as stealing from their bank account. At least some embodiments described herein improve the technology of cybersecurity for preventing or reducing malicious activity resulting from obtaining a phone number of a mobile device from a communication session between the mobile device and a service server hosting a service to which the mobile device is attempting to log into, and/or has logged into, by separating the MSISDN from the communication session. A malicious entity that gains improper access to the communication session cannot extract the MSISDN, since the MSISDN is not bound to the communication session.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
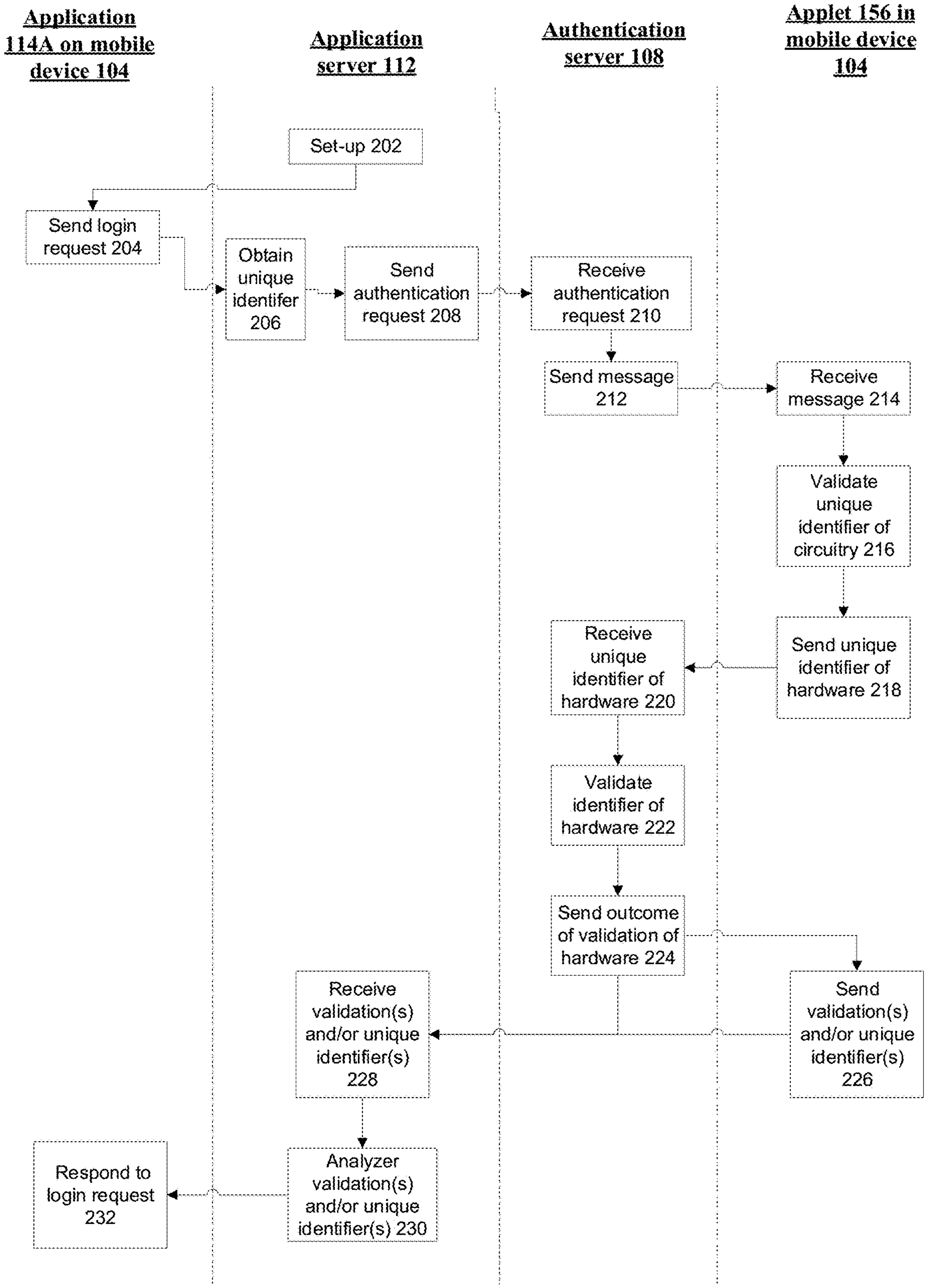
FIG. 2 is a sequence diagram of a method of authentication for accessing a service hosted by an application server using a mobile device, in accordance with some embodiments of the present invention.
Figure 3:
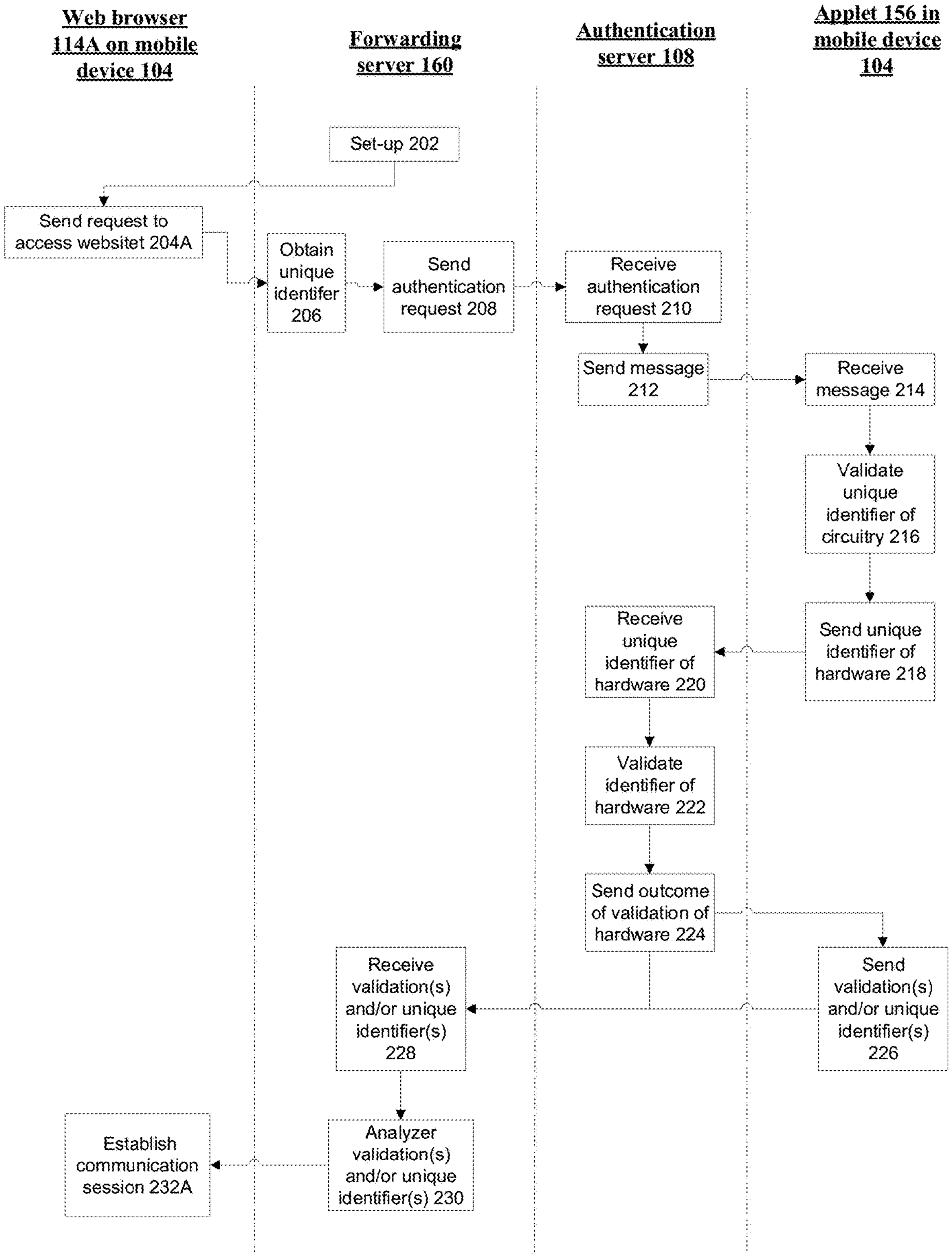
FIG. 3 is a sequence diagram of a method of authentication for accessing a website via a forwarding server by a web browser running on a mobile device, in accordance with some embodiments of the present invention.
Figure 4:
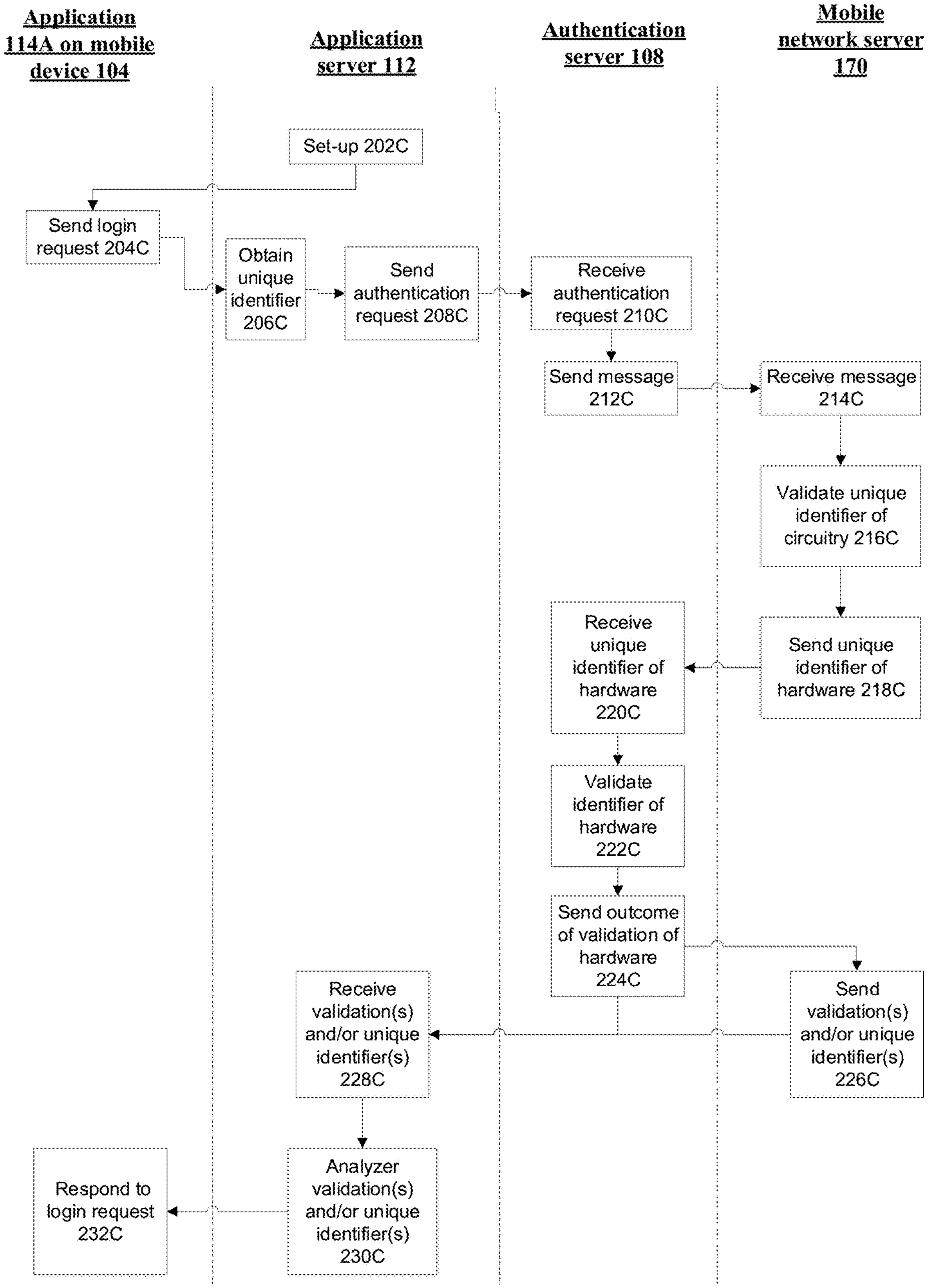
FIG. 4 is a sequence diagram of a method of authentication for accessing a service hosted by an application server using a mobile device by accessing a mobile network server, in accordance with some embodiments of the present invention.
Figure 5:
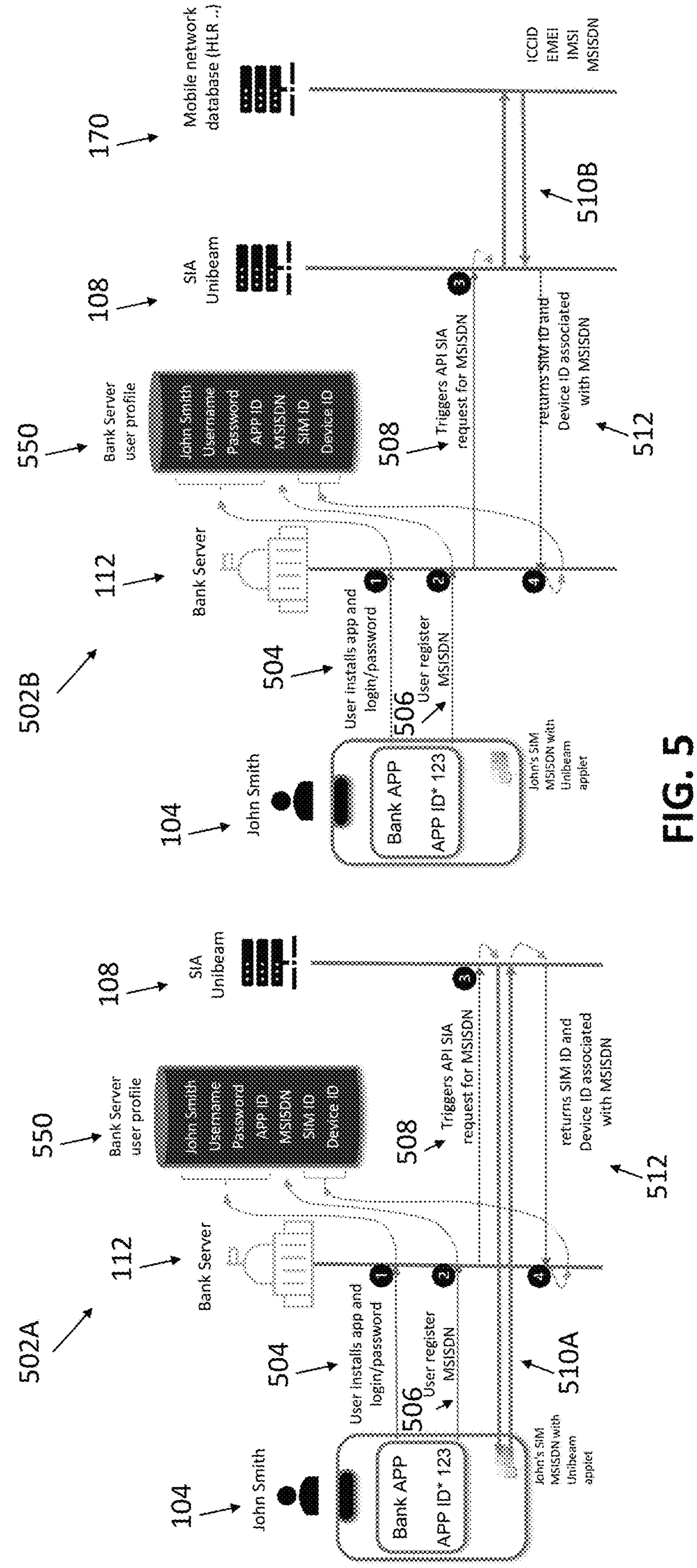
FIG. 5 includes sequence diagrams which differ in the source that provides the unique identifier of hardware of the mobile device, in accordance with some embodiments of the present invention.
Figure 6:
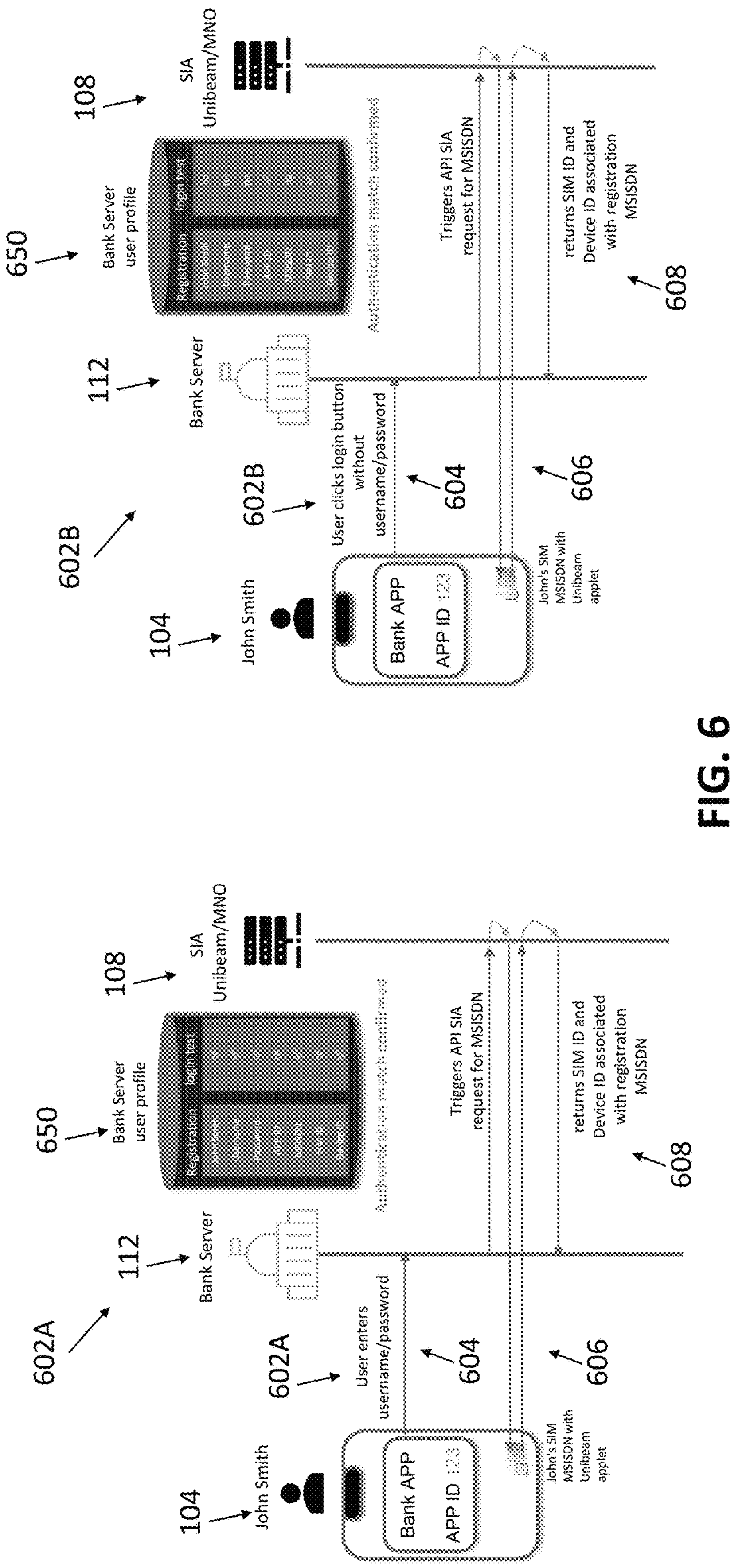
FIG. 6 includes sequence diagrams depicting login using a username and password and login without username and password, in accordance with some embodiments of the present invention.

Reference is now made to FIG. 1, which is a block diagram of components of a system 100 for authentication of a subscriber for accessing a service 112A hosted by an application server 112 (and/or for accessing a website 160A via forwarding server 160) using a mobile device 104, in accordance with some embodiments of the present invention. Reference is also made to FIG. 2, which is a sequence diagram of a method of authentication for accessing a service hosted by an application server using a mobile device, in accordance with some embodiments of the present invention. Reference is also made to FIG. 3, which is a sequence diagram of a method of authentication for accessing a website via a forwarding server by a web browser running on a mobile device, in accordance with some embodiments of the present invention. Reference is also made to FIG. 4, which is a sequence diagram of a method of authentication for accessing a service hosted by an application server using a mobile device by accessing a mobile network server, in accordance with some embodiments of the present invention. Reference is also made to FIG. 5, which includes sequence diagrams 502A and 502B which differ in the source that provides the unique identifier of hardware of the mobile device, in accordance with some embodiments of the present invention. Reference is also made to FIG. 6, which includes sequence diagrams 602A and 602B depicting login using a username and password and login without username and password, in accordance with some embodiments of the present invention.

System 100 may implement the acts of the method described with reference to FIGS. 2-6 by one or more of the following components: (i) processor(s) 102 of a computing device 104 executing code instructions stored in an applet 156 which is stored on a storage device 154 of circuitry 152, which may be located on a card 150, (ii) a processor(s) of an authentication server(s) 108, (iii) a processor(s) of an application server(s) 112, and (iv) a processor(s) of a forwarding server(s) 160 for accessing a website 160A. As used herein, features of methods implemented by the authentication server(s) and/or by the application server(s) are to be understood as processor(s) of the authentication server(s) and/or the application server(s) executing code. Processor(s) 102 of computing device 104 may execute application 114A, and/or code 106A, stored on a memory 106 and/or on a data storage device 114.

Card 150 may be, for example, a SIM card that is inserted into a slot of the computing device 104, and/or an eSIM card that is embedded in computing device 104.

Card 150 includes circuitry 152, which may include a storage component 154 storing applet 156, as described herein.

Applet 156 may be implemented, for example, as code instructions stored on a memory region of circuitry 152 and/or as hard-wired instructions. Applet 156 may be, for example, a program loaded into storage 154 by an external provider, for example, code of applet 156 is sent to cellular providers for loading on SIM cards that are provided to clients. Alternatively or additionally, applet 156 may be, for example, an existing identifier, an existing applet, and an existing code previously loaded on the circuitry 152 (e.g., hard-wired therein such as a unique identifier) and/or stored in storage 154, for example, by the cellular provider.

Computing device 104 may be implemented as, for example one or more and/or combination of: a mobile device (e.g., a Smartphone, a Tablet computer, a laptop computer, a wearable computer, glasses computer, and a watch computer), user equipment (UE), mobile station (MS), a camera, a computer, internet of things (IoT) device, a cellular modem, and a cellular hotspot. Computing device 104 may refer to, for example, a group of connected devices, a single client terminal, a server, a virtual server, a computing cloud, a virtual machine, a desktop computer, a thin client, a network node, and the like.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions 106A executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A and/or application 114A may implement one or more features and/or acts of the method described with reference to FIGS. 2-6 when executed by hardware processor(s) 102.

Computing device 104 may include a data storage device 114 for storing data, for example, one or more applications 114A which may request login to a service 112A hosted by an application server(s) 112 (e.g., payment application, online games, social network, application for attending a virtual conference). In another example, application 114A includes a web browser that sends a request to forwarding server(s) 160 for access to website 160A. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, a cellular network, the internet, a local area network, a virtual network, a wireless network, a local bus, a point to point link (e.g., wired), and/or combinations of the aforementioned. Network 110 may be accessed via SIM card 150, and/or via another connection (e.g., Wi-Fi).

Computing device 104 may include a network interface 116 for connecting to network 110, for example, one or more of, a cellular interface for connecting to the cellular network (e.g., antenna), a network interface card, a wireless interface to connect to a wireless network, a physical interface for connecting to a cable for network connectivity, a virtual interface implemented in software, network communication software providing higher layers of network connectivity, and/or other implementations.

Computing device 104 may communicate over network 110 with application server(s) 112 for requesting a login to service 112A, as described herein.

Computing device 104 may communicate over network 110 with forwarding server(s) 160 for requesting access to website 160A, as described herein.

Authentication server(s) 108 may communicate over network 110 with one or more mobile network server(s) 170 which may host one or more mobile network dataset(s) 170A. Mobile network dataset(s) 170A may store unique identifiers of circuitry and/or unique identifiers of hardware of mobile devices, for example, different mobile network operators providing cellular services to mobile devices store unique identifiers of circuitry and/or unique identifiers of hardware of mobile devices that are provided with cellular services by the respective mobile network operator. Authentication server(s) 108 may obtain data, optionally unique identifiers of circuitry and/or unique identifiers of hardware of computing device 104 from mobile network server(s) 170, such as from the mobile network dataset(s) 170A hosted by the mobile network server(s) 170, as described herein. Authentication server(s) 108 may obtain the data from mobile network server(s) 170 as an alternative to obtaining the data from applet 156, as described herein.

It is to be understood that mobile network server(s) 170 is an exemplary and not necessarily limiting implementation of a dataset storage device that is external to computing device 104 (and external to circuitry 152) which hosts the unique identifiers of circuitry and/or unique identifiers of hardware of computing device 104. The unique identifiers of circuitry and/or unique identifiers of hardware of mobile devices may be stored by other servers and/or other data storage devices, such as a computing cloud, and the like.

Application server(s) 112 and/or forwarding server(s) 160 may communicate over network 110 with authentication server(s) 108, optionally via a virtual interface 108A (e.g., application programming interface (API), software development kit (SDK), and the like).

Applet 156 running on computing device 104 may communicate over network 110 with authentication server(s) 108 and/or application server(s) 112, and/or forwarding server(s) 160, as described herein.

Computing device 104 includes and/or is in communication with one or more physical user interfaces 120 that include a mechanism for a user to enter data (e.g., attempt to use application 114A to login to service 112A hosted by application server(s) 112) and/or view data (e.g., view indication of whether verification was completed successfully). Exemplary user interfaces 120 include, for example, one or more of, a touchscreen, a display, a virtual reality display (e.g., headset), gesture activation devices, a keyboard, a mouse, and voice activated software using speakers and microphone.

Referring now back to FIG. 2, dataflow between the following components, and/or processing between the following components is described: application 114A running on mobile device 104 (executed by the processor(s) of the mobile device), application server 112 (i.e., code instructions executed by the processor(s) of the application server), authentication server 108 (i.e., code instructions executed by the processor(s) of the authentication server), and applet 156 of mobile device 104 (i.e., instructions of applet executed by the processor(s) of the mobile device). Mobile device 104, application server 112, authentication server 108, and applet 156 are described herein, for example, with reference to FIG. 1.

At 202, the application server may perform an initial set-up (e.g., configuration, initialization) for the user of the mobile device. The initial set-up may be performed as part of a registration process of registering the user for using the service.

The registration process may be triggered, for example, upon creation of new sensitive data, for example, a password and/or user credential and/or upon download of the application and/or upon installation of the applet and/or circuitry. The registration process may help ensure that the circuitry that was used for registration is the same circuitry that is currently installed in the mobile device when the mobile device is accessing the service. This helps secure access to the service by verifying that a malicious entity is not attempting to use another mobile device with other circuitry, with user credentials of a legitimate user, for accessing the server.

The application server may create a record that binds multiple data elements together, i.e., links the data elements to each other. The data elements include one or more of: a unique identifier of the mobile device sent by the application and/or operating system running on the mobile device, an application identifier (App ID) which may be created by the application running on the mobile device, a self-generated unique identifier (e.g., SIM ID) which may be created by the applet hosted by the circuitry, a self-generated unique number (e.g., device ID) which may be created by the applet hosted in the circuitry, -a unique identifier(s) of hardware installed within the mobile device (e.g., International Mobile Equipment Identity (IMEI), Integrated Circuit Card Identification Number (ICCID), Embedded Identity Document (EID), International Mobile Subscriber Identity (IMSI)), the unique identifier of the circuitry installed in the mobile device used as a destination address for sending a message from the authentication server to the applet (e.g., MSISDN which may be the phone number for authentication), a username for login (or other user credentials), and a password for login. One or more of the data elements of the record may be referred to herein as a login token.

The unique identifier of the mobile device sent by the application and/or operating system (OS) may be, for example, a client key, such as an Identifier for Advertising (IDFA) for iOS devices, and Google Advertising ID (GAID) for Android device. The unique identifier of the mobile device sent by the application and/or operating system may be, for example, a browser key sent by a browser that includes a unique identifier of the browser.

The record may be stored and/or managed by the application server.

The record enables confirming that the user attempting to log in is using the mobile device in which the circuitry that is being authenticated is installed, and has not obtained login credentials from another user where the other user's mobile device is the one with the circuitry that is being authenticated is installed. This allows preventing or reducing social engineering fraud in which login credentials of users are stolen and used. For example, a situation in which a malicious entity has obtained a name and password of a legitimate user for logging into an online banking account. The malicious entity does not have the physical mobile device with circuitry of the legitimate user, so is using their own mobile device. However, the malicious entity has succeeded in obtaining the login credentials (e.g., user name) and password of the legitimate user, and is attempting to use the login credentials and password of the legitimate user to log into the service. The mobile device of the malicious entity provides a unique identifier of hardware and/or the application and/or OS that is different than what is stored in the record. Even when the unique identifier of the circuitry of the mobile device of the legitimate user is found and authenticated as described herein, the application server detects that the name and password of the legitimate user do not match the unique identifier of hardware and/or the application which are of the malicious user. Since the malicious user is not physically using the mobile device of the legitimate user, the malicious user is unable to provide the unique identifier of hardware and/or of the application of the legitimate user. The application server is able to block access to the malicious user in response to detecting a mismatch in the data elements of the legitimate user and the malicious user.

At 204, a login request may be sent by the application running on the mobile device to the application server requesting to log into the service. The login request is for logging into the server hosted by the application server.

The login request may be sent by the application in response to the user opening the application and/or entering login data into the application.

Examples of applications and services include: banking, online gaming, online purchases, attendance of a conference, social network, government services and/or other bureaucratic services, healthcare management, email, and the like.

The login request may include the unique identifier of the mobile device sent by the application and/or operating system (e.g., client key) and/or browser key sent by the browser.

At 206, the application server receives the login request from the mobile device, and obtains a unique identifier of circuitry installed in the mobile device, optionally the MSISDN (i.e., phone number).

The unique identifier of the circuitry installed in the mobile device may be stored on a data storage device and accessed by the application server when the application running on the mobile device attempts to log into the service. The unique identifier of the circuitry installed in the mobile device may be obtained by extracting a login token (e.g., one or more data elements) from the login request, using the login token to identify a record of the user (e.g., created as described with reference to 202), and extracting the unique identifier of the circuitry installed in the mobile device from the record.

The unique identifier of the circuitry installed in the mobile device cannot necessarily be obtained from the communication session established between the mobile device and the application server. The unique identifier of the circuitry installed in the mobile device is non-extractable from a communication session established between the mobile device and the application server. The unique identifier of the circuitry installed in the mobile device is not added as metadata of a header of packets sent by the application server.

The unique identifier of the circuitry installed in the mobile device may be provided by a user only at a time of registration for the service.

The unique identifier of the circuitry installed in the mobile device may be provided by the mobile device when the application running on the mobile device attempts to log into the service.

At 208, the application server sends an authentication request to the authentication server.

The authentication request is for validation of the unique identifier of circuitry installed in the mobile device.

The authentication request may further include one or more of the following authentication data elements:

- The unique identifier of circuitry installed in the mobile device (e.g., MSISDN), which may be obtained from the record created as described with reference 202.
- A unique identifier of a communication session established between the mobile device and the application server, for example, a session key.
- A call back network address of the application server, for example, a callback URL.
- The unique identifier of the mobile device sent by the application and/or operating system (OS), for example, the client key.
- A unique identifier of a browser running on the mobile device that is attempting to access the service, for example, the browser key.
- A service key comprising a unique identifier of the service.
- Other key generated by the application server.

Keys described herein may be generated, for example, by feeding unique data into fed into a cryptographic process (e.g., hash function) that computes a cryptographic key which is provided as the key.

The authentication request may be sent to the application server via a virtual interface, for example, an application programing interface (API), and/or software development kit (SDK).

At 210, the authentication server obtains the authentication request from the application server.

The authentication request is obtained from the application server over a communication session that has a different session identifier from another communication session established between the mobile device and the application server.

At 212, the authentication server sends a message to the applet located in the storage component of the circuitry installed in the mobile device. The message may be sent to a destination address defined by the unique identifier of the circuitry of the mobile device extracted from the authentication request. For example, the message is a class two message (e.g., binary short message service (SMS) sent to the unique identifier which may be a MSISDN, i.e., phone number, of the circuitry (e.g., SIM, eSIM) of the mobile device.

The message sent by the authentication server to trigger the applet includes the call back network address of the application server, and may include one or more of the authentication data elements sent by the application server to the authentication server in the authentication request.

At 214, the mobile device receives the message sent by the authentication server.

The message triggers the applet stored in a storage component of the circuitry of the mobile device.

At 216, the applet validates the unique identifier of circuitry installed in the mobile device. The validation may of the circuitry may be performed by checking whether the mobile device has installed therein circuitry (e.g., SIM, eSIM) which is authenticated for cellular communication by a service provider (may be referred to herein as "live SIM"), for example, by an on-device verification process performed by the applet. The on-device verification is performed by the applet within the mobile device itself, without necessarily leaving the mobile device via a network and/or cellular connection. Additional exemplary details of the on-device verification performed by the applet are described, for example, with reference to U.S. patent application Ser. No. 17/667,597 "SIM BASED APPLICATION ACTION AUTHENTICATION" filed on Feb. 9, 2022, incorporated herein by reference in its entirety. It is noted that in at least some embodiments described with reference to Ser. No. 17/667,597, the authentication may be done using the same session, and the unique identifier (e.g., MSISDN) may be shared. In contrast, using at least some embodiments described herein, the authentication is done using a different session, and/or the unique identifier (e.g. MSISDN) is not shared.

At 218, the applet may send one or more unique identifiers of hardware installed within the mobile device to the authentication server. The unique identifier(s) of hardware installed within the mobile device may include, for example, one or more of: IMSI, EID, and ICCID.

The unique identifier of hardware is generated based on unique data that is hard-wired into the circuitry, for example, based on the IMEI and/or EID number assigned to the circuitry, and/or other unique encoding hard-wired into the circuitry. The hard-wiring ensures uniqueness of the unique identifier, and/or helps ensure that the unique identifier is tamper proof.

The applet may establish a communication session with the authentication server, for example, the applet opens a Transmission Control Protocol (TCP) socket to the authentication server. The applet may communicate with the authentication server over the communication session, for sending the unique identifiers of the hardware installed within the mobile device to the authentication server and/or obtaining data from the authentication server. Alternatively or additionally, the applet sends the unique identifiers of the hardware installed within the mobile device to a phone number (i.e., MSISDN) of the authentication server in a class 2 messages (e.g., binary SMS).

The communication session established by the applet with the authentication server may be a new unique communication session (e.g., with a unique session ID) that is different from other established communication sessions (e.g., which have different session IDs), for example, different than the communication session established between the mobile device and the application server, and/or different than the communication session established between the applet and the application server (e.g., as described herein).

At 220, the authentication server may receive the unique identifier of hardware installed within the mobile device from the applet, for example, over the communication session and/or via the class 2 message.

At 222, the authentication server may validate the unique identifier of hardware installed within the mobile device. The validation may be done, for example, by checking that the unique identifier of hardware installed within the mobile device matches a record, which may be created when the circuitry within the mobile device is activated.

At 224, the authentication server sends an outcome of the validation of the unique identifier of the hardware installed within the mobile device to the applet. Alternatively or additionally, the authentication server may directly send the outcome of the validation of the unique identifier of the hardware installed within the mobile device to the application, without necessarily going through the applet.

The outcome of the validation may be sent to the applet, for example, over the communication session established by the applet, and/or via a class 2 message (e.g., binary SMS) sent to the MSISDN of the mobile device.

At 226, the applet sends an outcome of the validation of the unique identifier of circuitry installed in the mobile device to the application server using the call back network address. The applet may further send to the application server, one or more of:

- The outcome of the validation of the unique identifier of hardware installed within the mobile device, which is obtained from the authentication server.
- One or more of the authentication data elements described herein, which were provided in the authentication request to the authentication server and sent to the applet.
- Other data elements which may be used for validation, for example, an applet key created by the applet which may be validated by the application server.

The applet may establish a communication session with the application server, for example, the applet opens a TCP socket to the authentication server. The applet may communicate with the application server over the communication session, for sending the outcome of the validation of the unique identifier of circuitry and/or other data of the bullet list above.

The communication session established by the applet with the application server may be a new unique communication session (e.g., with a unique session ID) that is different from other established communication sessions (e.g., which have different session IDs), for example, different than the communication session established between the mobile device and the application server, and/or different than the communication session established between the applet and the authentication server.

Alternatively or additionally, the applet may send a message to a phone number (i.e., MSISDN) of the authentication server in a class 1 message.

At 228, the application server obtains the outcome of the validation of the unique identifier, from the applet, via the callback network address.

The application server may obtain the outcome of the validation of the unique identifier(s) of hardware installed within the mobile device, which was validated by the authentication server, and passed to the applet, as described herein.

The application server may obtain other authentication elements from the applet via the callback network address, as described herein.

At 230, the application server may analyze the validation(s) of the unique identifier(s) and/or other authentication element(s) and/or other data, obtained from the applet.

The analysis may include one or more of:

- Verifying that the unique identifier(s) of the circuitry installed in the mobile device has been validated, optionally by the applet.
- Verifying that the unique identifier(s) of hardware installed within the mobile device has been validated, optionally by the authentication server (e.g., in response to being provided the unique identifier of hardware installed within the mobile device by the applet).
- Matching the unique identifier(s) of hardware obtained from the applet to a unique identifier of the mobile device defined by the record created as described with reference to 202.
- Verifying other data elements, for example, the applet key created by the applet.

At 232, the application server responds to the login request according to the analysis, for example, according to the verification(s) and/or the matching.

When the verifications are positive and/or the matching is made, the application server may grant access to the service in response to the login request.

Alternatively, the application server may reject access to the service requested in the login request when the outcome of the validation(s) indicates invalidity, and/or no match is found.

Referring now back to FIG. 3, dataflow between the following components, and/or processing between the following components is described: web browser (i.e., application) 114A running on mobile device 104 (executed by the processor(s) of the mobile device), forwarding server 160 (i.e., code instructions executed by the processor(s) of the forwarding server), authentication server 108 (i.e., code instructions executed by the processor(s) of the authentication server), and applet 156 of mobile device 104 (i.e., instructions of applet executed by the processor(s) of the mobile device). Mobile device 104, forwarding server 160, authentication server 108, and applet 156 are described herein, for example, with reference to FIG. 1.

It is noted that the website is not necessarily hosted by the forwarding server. The website may be hosted by another server, which is physically different than forwarding server and/or located at a different geographical location. Forwarding server may forward network traffic between the mobile device and the other server that hosts the website.

The sequence diagram described with reference to FIG. 3 may provide security for the website and/or for the mobile device, by authentication of users and authentication of the circuitry installed in the mobile device, which is attempting to access the website.

The sequence diagram described with reference to FIG. 3 is similar to the sequence diagram described with reference to FIG. 2, with the following differences:

At 204A (which replaces 204 of FIG. 2), the web browser running on the mobile device sends a request to the forwarding server, to access a certain website via the forwarding server. The request may include an address of the certain website.

At 232A (which replaces 232 of FIG. 2), the application server responds to the access request according to the analysis, for example, according to the verification(s) and/or the matching.

When the verifications are positive and/or the matching is made, the forwarding server may establish a communication session between the mobile device and the website according to the address of the website provided by the mobile device in the access request.

Alternatively, the forwarding server may reject access to the website requested in the access request when the outcome of the validation(s) indicates invalidity, and/or no match is found.

Referring now back to FIG. 4, dataflow between the following components, and/or processing between the following components is described: application 114A running on mobile device 104 (executed by the processor(s) of the mobile device), application server 112 (i.e., code instructions executed by the processor(s) of the application server), authentication server 108 (i.e., code instructions executed by the processor(s) of the authentication server), and mobile network server 170. Mobile device 104, application server 112, authentication server 108, and mobile network server 170 are described herein, for example, with reference to FIGS. 1-3. Blocks 202C-232C of FIG. 4 may correspond to, and/or include features of blocks 202-232 described with reference to FIG. 2. Features described with reference to blocks 202C-232C of FIG. 4 may be included and/or may serve as alternatives to, features of blocks 202-232 described with reference to FIG. 2. The flows described with reference to FIG. 2 and FIG. 4 are generally similar, with the significant difference being in the component that provides the unique identifier of hardware of the mobile device (218 and 218C). In FIG. 2 the applet of the mobile device provides the unique identifier of hardware of the mobile device, which in FIG. 4 the mobile network server provides the unique identifier of hardware of the mobile device.

For clarity, additional features described below with reference to 202C-232C represent additional features over the features described with reference to 202-232 with reference to FIG. 2.

At 202C, set-up may be performed, for example, as described with reference to 202 of FIG. 2.

At 204C, a login request to log into the service hosted by the application server may be sent, optionally by an application running on the mobile device.

The login request may exclude user entered data, such as personal and/or sensitive data of the user, for example, a name of the user, a username of the user, and a password of the user.

The login request may be automatically generated, optionally by the application running on the mobile device. The login request may be automatically generated and sent in response to, for example, a user click on a link, and/or touch of a button, optionally a single action (e.g., single click and/or single touch), without requiring the user to enter additional data such as personal and/or sensitive data.

The login request may include automatically self-generated data created by the application running on the mobile device and/or by an applet running on the mobile device. Examples of self-generated data includes an App ID generated by the application, a self-generated unique identifier generated based on unique data that is hard-wired into the mobile device, and a self-generated unique number created by the applet. Examples of the self-generated unique number include ICCID denoting a SIM ID, and EMEI denoting a device ID. Additional details of the self-generated unique identifier generated based on unique data that is hard-wired into the mobile device are described herein.

At 206C, the application server receives the login request from the mobile device. The application server obtains a unique identifier of circuitry installed in the mobile device, for example, as described with reference to 206 of FIG. 2.

The unique identifier of circuitry may include the MSISDN number and/or IMSI.

The login request may include the unique identifier of circuitry installed within the mobile device.

The application server may validate the login request by matching the unique identifier of circuitry to a user profile record. The user profile record may be created when the circuitry within the mobile device is activated.

Alternatively or additionally, the application server may validate the login request by matching additional data included in the login request to the user profile record. The additional data included in the login request may include automatically self-generated data described herein. Examples of additional data includes: a name of the user, a username of the user, a password of the user, an App ID created by the application running on the mobile device, the unique identifier of circuitry installed within the mobile device, and the unique identifier of hardware installed within the mobile device.

At 208C, an authentication request is sent by the application server an authentication server. The authentication request may be sent in response to the validation described with reference to 206C.

The authentication request may be for validation of the unique identifier of circuitry installed in the mobile device. The authentication request includes the unique identifier of circuitry installed in the mobile device. The authentication request may include additional data which may be provided in the login request and/or stored in the user profile record stores.

At 210C, the authentication server obtains the authentication request for authenticating the unique identifier of circuitry installed in the mobile device from the application server hosting the service. The authentication request including the unique identifier and/or additional data as described herein.

At 212C, a message including the unique identifier of circuitry of the mobile device, is sent from the authentication server to a mobile network server.

At 214C, the mobile network server receives the message.

At 216C, the mobile network server may validate the unique identifier of circuitry of the mobile device, for example, as described with reference to 216 of FIG. 2.

At 218C, the mobile network server provides the unique identifier of hardware of the mobile device to the authentication server.

The unique identifier of the hardware of the mobile device indicates that the mobile device is authenticated for cellular communication by a service provider associated with the mobile network server.

The unique identifier of hardware installed within the mobile may include an Integrated Circuity Card Identification (ICCID) and/or an Embedded Mobile Equipment Identity (EMEI).

The unique identifier of hardware of the mobile device may include a self-generated unique identifier generated based on unique data that is hard-wired into the mobile device. The unique data that is hard-wired into the circuitry may include an international mobile subscriber identity (IMSI). The self-generated unique identifier may be computed by feeding the unique data into a cryptographic process that computes a cryptographic value. Alternatively or additionally, the self-generated unique identifier may be computed based on a combination of the unique data and metadata provided by the application fed into a hashing process. The self-generated unique identifier may be computed by an applet stored in a storage component of circuitry installed in the mobile device.

Additional exemplary details of a self-generated unique identifier generated based on unique data that is hard-wired into the mobile device is described, for example, with reference to U.S. patent application Ser. No. 17/667,597 incorporated herein by reference in its entirety.

At 220C, the authentication server obtains the unique identifier of hardware of the mobile device from the mobile network server.

At 222C, validation of the unique identifier of the circuitry of the mobile device is performed. The validation may be performed by checking that the unique identifier of hardware of the mobile device (received from the mobile network server) corresponds to the unique identifier of circuitry of the mobile device, for example, according to the user record and/or records of mobile devices hosted by the mobile network server.

The validation may be performed, for example, by the authentication server, the mobile network server, the application server, and/or other devices.

In an example, the validation is performed by verifying that the ICCID obtained from the mobile network server corresponds to the MSISN and/or the IMSI at a time interval of performing the authentication. In another example, the validation is performed by verifying that the EMEI obtained from the mobile network server corresponds to the MSISN and/or the IMSI at a time interval of performing the authentication.

At 224C, an outcome of the validation may be sent to the application server.

Alternatively, at 226C, the mobile network server may send an outcome of the validation of the unique identifier of circuitry installed in the mobile device to the application server using the call back network address. The call back network address may be as described herein.

At 228C, an outcome of the validation of the unique identifier of the circuitry is obtained from the authentication server.

At 230C, the outcome may be analyzed, for example, as described with reference to 230 of FIG. 2.

At 232C, a response to the login request may be generated according to the outcome of the validation, for example, as described with reference to 232 of FIG. 2.

Referring now back to FIG. 5, sequence diagrams 502A and 502B which differ in the source that provides the unique identifier of hardware of the mobile device, are depicted. Components and/or features described with reference to FIG. 5 are based on, and/or correspond to, and/or include details, described with reference to FIGS. 1-4.

In sequence diagrams 502A and 502B, flow is between mobile device 104, application server 112 (e.g., bank server), authentication server 108, and optionally mobile network server 170 (in 502B).

The following flow is common to sequence diagrams 502A and 502B:

At 504, an app is installed on a mobile device of a user. For example, the app is for accessing a bank application hosted by a bank server. Details of the user and/or mobile device may be provided and stored in a record (i.e., bank server user profile) 550, for example, name of the user, username, password, and App ID.

At 506, the unique identifier of circuitry of the mobile device (e.g., MSISDN) may be registered with the bank server, such as by being stored in the record.

At 508, the bank server sends an authentication to the application server for authenticating the unique identifier of circuitry of the mobile device, for example, in response to a login request sent by the mobile device for accessing the bank application hosted by the bank server. The authentication request may be sent, for example, as an API request.

At 512, the authentication server provides to the bank server, the unique identifier(s) of hardware of the mobile device (e.g., SIM ID such as ICCID, and/or device ID such as EMEI) which correspond to the unique identifier of circuitry (e.g., MSISDN) of the mobile device.

The difference between sequence diagrams 502A and 502B is the source that provides the unique identifier(s) of hardware of the mobile device.

In sequence diagram 502A, at 510A, the unique identifier of hardware of the mobile device is obtained from the applet of the mobile device, for example, as described with reference to FIG. 2 and/or U.S. patent application Ser. No. 17/667,597.

In sequence diagram 502B, at 510B, the unique identifier of hardware of the mobile device is obtained from the mobile network server, for example, as described with reference to FIG. 4.

Referring now back to FIG. 6, sequence diagrams 602A and 602B depicting login using a username and password and login without username and password, are presented. Sequence diagram 602B provides higher cyber security over sequence diagram 602A, since there are no usernames, passwords, and/or other personal and/or sensitive details that may be stolen and used for malicious login.

Components and/or features described with reference to FIG. 6 are based on, and/or correspond to, and/or include details, described with reference to FIGS. 1-5.

In sequence diagrams 602A and 602B, flow is between mobile device 104, application server 112 (e.g., bank server), and authentication server 108.

In sequence diagram 602A, at 604A, a user enters a username and/or password (and/or other personal and/or sensitive data, which is at risk of being stolen and used for malicious login, as described herein. The user may be authenticated by matching multiple data provided by the user and/or mobile device to a record 650 (i.e., bank server user profile) of the bank server, for example, name of user, username, password, App ID, unique identifier of circuitry (e.g., MSISDN), unique identifier(s) of hardware (e.g., SIM ID, and/or device ID).

Alternatively, in sequence diagram 602B, a user does not provide a username and/or password (and/or other personal and/or sensitive data). The user may request login to the bank application hosted by the bank server, for example, by clicking a login button. The user may be authenticated based on the hardware of their mobile device, by authenticating that the unique identifier(s) of hardware (e.g., SIM ID, and/or device ID) of the mobile device corresponds to the unique identifier of circuitry (e.g., MSISDN), as described herein.

Features 604, 606, and 608 may be common to sequence diagrams 602B and 602B. Features 604, 606, and 608 correspond to features 508, 510A, and 512 described with reference to FIG. 5.

It is noted that as shown in 606 of 602A and 602B, the unique identifier of hardware is obtained from the applet according to 510A of FIG. 5, but is to be understood that the unique identifier of hardware may alternatively be obtained from the mobile network server according to 510B of FIG. 5.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant circuitry and mobile devices will be developed and the scope of the terms circuitry and mobile device are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for authentication of a subscriber for accessing a service hosted by an application server using a mobile device, comprising:

at least one processor of an authentication server executing a code for:

obtaining an authentication request for authenticating a unique identifier of circuitry installed in the mobile device from the application server hosting the service, the authentication request including the unique identifier;

wherein the authentication request is sent by the application server in response to a login request to log into the service automatically generated by an application running on the mobile device, the login request excludes user entered data and includes automatically self-generated data created by the application running on the mobile device and/or by an applet running on the mobile device, and the application server validates the login request by matching the automatically self-generated data to a user profile record;

wherein the user entered data excluded from the login request includes a password of the user;

sending a message including the unique identifier of circuitry of the mobile device to a mobile network server;

receiving a unique identifier of hardware of the mobile device from the mobile network server, wherein the unique identifier of hardware of the mobile device comprises a self-generated unique identifier generated based on unique data that is hard-wired into the mobile device;

performing validation of the unique identifier of the circuitry of the mobile device by validating that the unique identifier of hardware of the mobile device corresponds to the unique identifier of circuitry of the mobile device; and sending an outcome of the validation to the application server.

2. The system of claim 1, wherein the self-generated unique identifier is computed by feeding the unique data into a cryptographic process that computes a cryptographic value.

3. The system of claim 1, wherein the self-generated unique identifier is computed based on a combination of the unique data and metadata provided by the application fed into a hashing process.

4. The system of claim 1, wherein the self-generated unique identifier is computed by an applet stored in a storage component of circuitry installed in the mobile device.

5. The system of claim 1, wherein the unique data that is hard-wired into the circuitry comprises an international mobile subscriber identity (IMSI).

6. The system of claim 1, wherein the unique identifier of the hardware of the mobile device indicates that the mobile device is authenticated for cellular communication by a service provider associated with the mobile network server.

7. The system of claim 1, wherein the unique identifier of hardware installed within the mobile device comprises an Integrated Circuity Card Identification (ICCID), and the unique identifier of circuitry comprises a mobile station integrated services digital network (MSISDN) number and/or international mobile subscriber identity (IMSI) and the validation is performed by verifying that the ICCID obtained from the mobile network server corresponds to the MSISDN and/or the IMSI at a time interval of performing the authentication.

8. The system of claim 1, wherein the unique identifier of hardware installed within the mobile comprises an Embedded Mobile Equipment Identity (EMEI), and the unique identifier of circuitry comprises a mobile station integrated services digital network (MSISDN) and/or international mobile subscriber identity (IMSI) and the validation is performed by verifying that the EMEI obtained from the mobile network server corresponds to the MSISDN and/or the IMSI at a time interval of performing the authentication.

9. The system of claim 1 wherein the user entered data excluded from the login request includes a name of the user and a username of the user.

10. The system of claim 1, wherein the login request is automatically generated and sent in response to a user click or touch of a button without providing the user entered data.

11. The system of claim 1, wherein the self-generated data includes at least one of an App identifier (ID) generated by the application, and at least one self-generated unique number created by the applet.

12. The system of claim 11, wherein the at least one self-generated unique number is selected from: Integrated Circuity Card Identification (ICCID) denoting a subscriber identification module identifier (SIM ID), and Embedded Mobile Equipment Identity (EMEI) denoting a device identification ID.

13. The system of claim 1, wherein the authentication request is sent by the application server in response to a login request to log into the service by an application running on the mobile device, the login request including the unique identifier of circuitry installed within the mobile device, and the authentication request may be sent in response to validating by the application server that the unique identifier of circuitry matches a user profile record created when the circuitry within the mobile device is activated.

14. The system of claim 13, wherein the authentication request includes additional data, and the user profile record stores additional data.

15. The system of claim 14, wherein the additional data includes at least one of: a name of the user, a username of the user, a password of the user, an App ID created by the application running on the mobile device, the unique identifier of circuitry installed within the mobile device, and the unique identifier of hardware installed within the mobile device.

16. A system for authentication of a subscriber for accessing a service hosted by an application server using a mobile device, comprising: at least one processor of an application server executing a code for:

obtaining a login request to log into the service hosted by the application server by an application running on the mobile device;

obtaining a unique identifier of circuitry installed in the mobile device;

sending to an authentication server, an authentication request for validation of the unique identifier of circuitry installed in the mobile device, the authentication request including the unique identifier;

wherein the login request is automatically generated by an application running on the mobile device, the login request excludes user entered data and includes automatically self-generated data created by the application running on the mobile device and/or by an applet running on the mobile device, and the application server validates the login request by matching the automatically self-generated data to a user profile record, wherein the user entered data excluded from the login request includes a name of the user, a username of the user, and a password of the user, and the login request is automatically generated and sent in response to a user click or touch of a button without providing the user entered data;

obtaining from the authentication server, an outcome of the validation of the unique identifier of circuitry performed by validating that a unique identifier of hardware of the mobile device obtained from a mobile network server corresponds to the unique identifier of circuitry of the mobile device, wherein the unique identifier of hardware of the mobile device comprises a self-generated unique identifier generated based on unique data that is hard-wired into the mobile device; and responding to the login request according to the outcome of the validation.

17. The system of claim 16, wherein the unique identifier of hardware installed within the mobile device comprises a Integrated Circuit Card Identification (ICCID) denoting a subscriber identification module identifier (SIM ID) and the unique identifier of circuitry comprises a mobile station integrated services digital network (MSISDN) number and/or international mobile subscriber identity (IMSI), and the validation is performed by verifying that the ICCID obtained from the mobile network server corresponds to the MSISDN and/or the IMSI at a time interval of performing the authentication.

18. The system of claim 16, wherein the unique identifier of hardware installed within the mobile comprises an Embedded Mobile Equipment Identity (EMEI) denoting a device identification (ID), and the unique identifier of circuitry comprises a mobile station integrated services digital network (MSISDN) and/or international mobile subscriber identity (IMSI) and the validation is performed by verifying that the EMEI obtained from the mobile network server corresponds to the MSISDN and/or the IMSI at a time interval of performing the authentication.

* * * * *